May 2, 1950
J. DE KONING
2,505,756
APPARATUS FOR THE PROPORTIONING
AND CONTROL OF FLUID FLOW
Filed Dec. 23, 1946
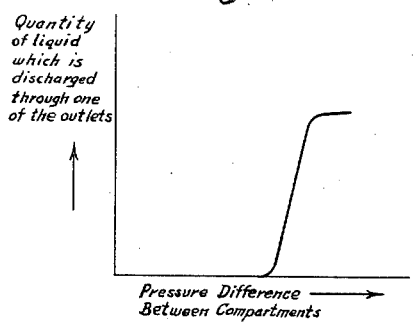
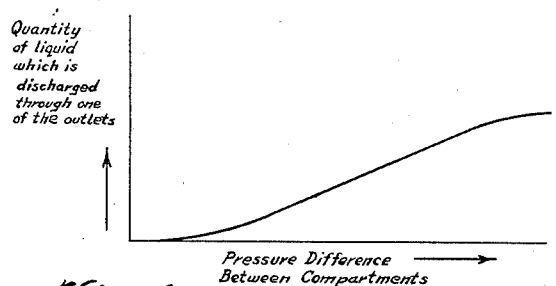
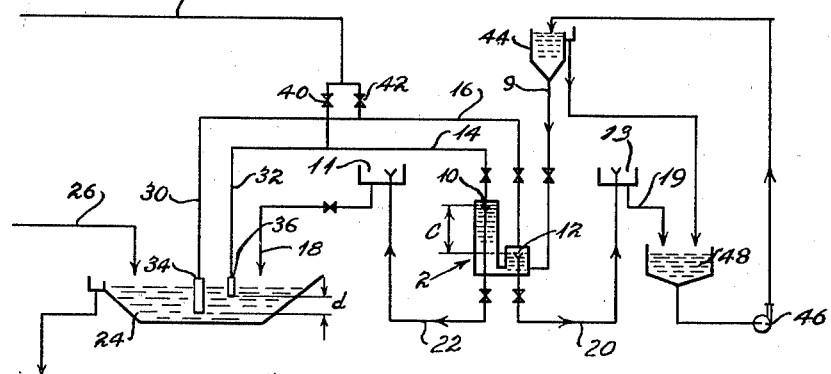
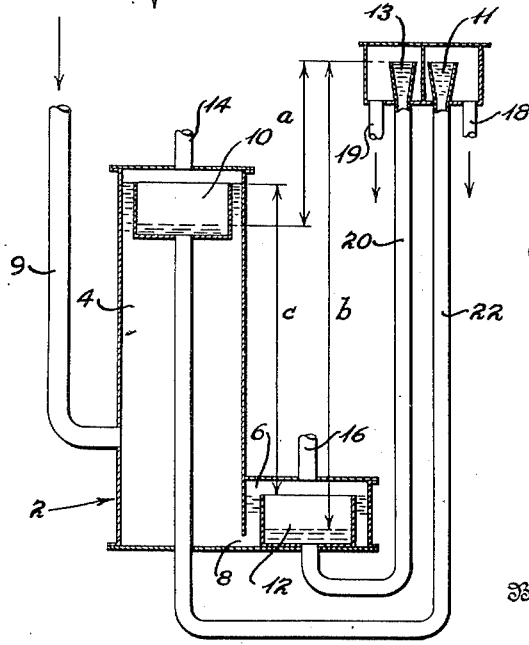
Inventor
Jacob de Koning
By Cushman, Darby & Cushman
Attorneys Patented May 2, 1950

2,505,756

UNITED STATES PATENT OFFICE 2,505,756

APPARATUS FOR THE PROPORTIONING AND CONTROL OF FLUID FLOW

Jacob de Koning, Treebeek, Netherlands, assignor to De Directie van de Staatsmijnen in Limburg, Heerlen, Netherlands Application December 23, 1946, Serial No. 718,056
In the Netherlands December 23, 1943

Section 1, Public Law 690, August 8, 1946
Patent expires December 23, 1963

4 Claims. (Cl. 137—78)

This invention relates to an apparatus for the proportioning and control of fluid flow, and is particularly concerned with a new apparatus for the proportioning and regulation of a liquid stream without recourse to mechanical moving parts.

The control of liquid flow and the proportioning of liquids is generally carried out by means of valves which may be operated either directly or indirectly. Direct regulation with the valves is accomplished by hand while indirect regulation of fluid flow by valves is accomplished automatically, electrically or pneumatically.

The regulation of fluid flow by means of valves or other methods which employ mechanical moving parts involves certain inherent disadvantages. For example, regulation of valves indirectly from a distance involves the use of rather complicated structures which may give rise to many types of mechanical difficulties. In addition, when the proportioning or regulation of corrosive liquids is involved, valves of special construction, e. g., membrane valves, and valves made from special materials must generally be used. Furthermore, in regulating liquids which may contain large percentages of finely divided substances dispersed therein, the moving parts of valves may be rendered inoperative by the finely ground suspended materials.

A principal object of this invention is the provision of a new apparatus for the control of flow of fluids. Further objects include the provision of a liquid proportioning and flow control device characterized by the following features:

1. No moving mechanical parts in the apparatus per se.
2. Provision for the proportioning of a liquid stream without the use of valves, mechanical pumps, or the like.
3. Adaptability for use with all types of liquids, even the most corrosive or those containing large proportions of suspended solids.

Further objects and the entire scope of applicability of the present invention will become apparent from the detailed description given hereinafter.

These objects are accomplished according to the present invention by conducting the liquid to be proportioned and regulated through a space which is divided into two compartments. The two compartments communicate with each other below the liquid level, preferably near the base of the compartments, and are each provided with an overflow outlet. The liquid level in each of the compartments is regulated by controlling the difference in pressure present in the space in the compartments over the liquids contained in the compartments. This regulation of the pressure and liquid level results in a regulation of the liquid as indicated above.

The apparatus in which this regulation is carried out does not contain any moving part for the purpose of dividing the liquid and is of very simple construction. It can be constructed of any suitable material, e. g., stainless steel, ceramics, etc., and is, therefore, especially adapted for dividing and regulating corrosive liquids.

The pressure difference in the spaces in the compartments lying over the liquid levels is regulated pneumatically. The quantities of liquid can be regulated in dependence upon any factor which can be converted into a pressure difference. By suitably choosing the discharge devices of both compartments, either a regulation can be effected which gradually follows the pressure difference, or a regulation which comes into action when a certain ultimate value of the pressure difference is exceeded. The first manner of regulating is used in proportioning liquids, the second manner, e. g., in maintaining some definite concentration or specific gravity. Both ways of regulating are shown in the graphs included in the drawing and in which graphs the quantities of liquid which are discharged by one of the outlets have been plotted against the pressure difference existing between the two compartments of the proportioning device.

A more complete understanding of the apparatus of this invention may be had by reference to the accompanying drawings, in which Figure 1 is a graph showing one type of fluid flow regulation which may be accomplished by this invention.

Figure 2 is a graph similar to Figure 1, showing another type of fluid flow which may be obtained with this invention.

Figure 3 is a diagrammatical side elevational view of one embodiment of apparatus which may be used in this invention.

Figure 4 is a flow diagram of a unit of a coal treating plant incorporating the proportioning device of this invention.

Referring particularly to Figure 3, the liquid stream proportioning device consists of a unit or casing 2 which is divided into two compartments 4 and 6 communicating with each other below the liquid level at 8. The liquid stream to be controlled enters the unit at 9.

The compartments 4 and 6 are provided with outlets 10 and 12, respectively, each shaped as an overflow which communicates with the atmosphere by a liquid seal, the communications shown in the drawing being by way of overflows 11 and 13, respectively. The pressure in the compartments is regulated by introducing compressed air through pipes 14 and 16.

If the pressure in both compartments 4 and 6 is the same, e. g., equal to $b$ mm. liquid, the liquid level will be at the same height in both compartments, namely at the top of overflow 12 in compartment 6 and at an identical height in compartment 4. All liquid introduced into the apparatus will, therefore, flow over at 12 and will be discharged at 19 through the ascending conduit 20 and overflow 13. When, however, the pressure in compartment 4 is lowered, the liquid will rise therein. As soon as the pressure difference between 4 and 6 amounts to $c$ mm. liquid, the level in 4 will have reached the top of overflow 10. Thus, when the pressure difference is exactly $c$ mm., liquid entering the apparatus will be divided and equal quantities of liquid will flow over at 10 and at 12, and will be discharged from the apparatus through the ascending conduits 22 and 20, respectively, and the overflows 11 and 13, respectively, and 18 and 19.

If now the pressure in 6 is raised a little, and in consequence, the pressure difference between the compartments is caused to exceed $c$ mm., the level in 6 sinks below the top of overflow 12, and all liquid flows away through overflow 10. Thus, $c$ is the limiting value of the pressure difference, above which all liquid flows over at 10 and 11, respectively, and below which all liquid flows over at 12 and 13, respectively.

Figure 4 is a flow sheet of an embodiment of the present process for keeping constant the specific weight of a bath for the separation of coal and rock according to specific weight. In this figure, 24 indicates a suspension bath, the specific weight of which has to be kept accurately constant. To keep the bath up to the mark, a continuous supply of suspension is provided at 26. The specific weight of this supply suspension may vary more or less, (care however being taken that it is always higher than the desired specific weight) and increases arising therefrom in the specific weight of the bath are compensated by introducing water at 18. The quantity of water, if any, which must be introduced into the bath at 18 must, in consequence, depend upon the specific weight of the bath. If the latter is only a little above or a little below that which is desired, only a little or no water must be supplied. In case the difference is great, considerable water has to be supplied.

The present invention provides the desired flow control by using the specific weight of the bath as a regulating factor. Thus, the specific weight is converted into a pressure factor by providing two conduits 30 and 32 which open into the bath at different depths, both conduits communicating on the other side with the proportion unit or space 2. The pressure difference $(d)$ at the levels where the immersed ends of the dipping tubes 34 and 36 open is a measure for the specific weight. The tubes 30 and 32 are connected to a compressed air supply tube 38. By means of valves 40 and 42, the air supply can be adjusted to let some air escape from the dipping tubes 34 and 36, so that it can be ensured that the pressure in the conduits 30 and 32 is exactly the same as the pressure in the bath at the levels where the dipping tubes open therein. Since the conduits 30 and 32 communicate with the pipes 16 and 14, respectively, which in turn communicate with the spaces above the overflows 12 and 10, respectively, of the dividing apparatus, the pressures in such spaces will correspond with those at the aforesaid levels in the bath.

The dividing apparatus is supplied with water from tank 44 through conduit 9. Tank 44 is kept up to the mark by means of a pump 46 and an overflow, connected to the pump tank 48. The difference $(c)$ in height between the overflows 10 and 12 in the dividing apparatus is equal to the difference in depth of immersion of the open ends of the dipping tubes 34 and 36, multiplied by the desired specific weight of the bath in 24.

If the specific weight is right, the pressure difference in the spaces above the overflows 10 and 12 will be equal to $c$ mm. water column, and equal quantities of water will pass through 10 and 12. Water, flowing over at 12, flows through conduit 20, overflow 13 and conduit 19 to pump tank 48, and recirculates.

When the specific weight of the bath gets too low, the pressure difference between 34 and 36 will decrease, as will also the pressure difference in the spaces over the overflows 10 and 12 in the dividing apparatus; in consequence, the liquid level will sink below the top edge of overflow 10, and water will flow away over 12 only, so that water is no longer supplied to the bath 24. When, however, the specific weight in the bath gets too high, the pressure difference between 34 and 36 and also in the spaces over 10 and 12 in the dividing apparatus will rise, the liquid level sinks below the top edge of 12 and all water flows through 10 to the bath. Thus, the suspension is diluted until the desired specific weight is again reached.

By varying the construction of the regulating apparatus, the volume of the dead space over the overflows 10 and 12, the volume of the air conduits 30 and 32, the quantity of air supplied at 38, and the length of the overflow edges, etc., the proportioning apparatus is made more or less sensitive, i. e., made to provide control as shown in Figures 1 or 2.

I claim:

1. Apparatus for proportioning a liquid supply, comprising two compartments communicating with each other below the liquid level therein, each compartment being provided with an overflow outlet for the liquid, and means for regulating the pressure of the atmosphere over the liquids in both compartments, one of the two compartments being provided with an inlet for the liquid supply.

2. In apparatus for proportioning a liquid supply, a pair of compartments adapted to be connected to the liquid supply to be proportioned, the two compartments communicating with each other below the liquid level therein, a pair of conduits respectively extending to a closed space above the liquid level of the respective compartments, said conduits being adapted to be connected to respectively different sources of pressure, each of said compartments being provided with an overflow outlet, the overflow outlet of one compartment being vertically spaced from that of the other compartment.

3. In combination, a container for a first liquid the specific gravity of which may vary from a desired value, a pair of compartments for a second liquid having such specific gravity that it is capable of restoring said first liquid in said container to a desired value, the two compartments communicating with each other below the liquid level therein, a first conduit extending from a given depth in said first liquid to a point above the liquid level in the first of said compartments, a second conduit extending from a less depth in said first liquid to a point above the liquid level in the second of said compartments, each conduit opening to a closed space above the liquid level in the corresponding compartment, a source of pressure communicating with both of said conduits, a source of said second liquid in communication with said compartments, each of said compartments being provided with an overflow outlet, the overflow outlet of one compartment being vertically spaced from that of the other compartment by a distance depending upon the specific gravity at which said first liquid is to be maintained, the overflow outlet of one of said compartments being in communication with said first liquid container.

4. The combination described in claim 3, wherein the overflow outlet of the second of said compartments is in communication with said first liquid container.

JACOB DE KONING.

REFERENCES CITED

The following references are of record in the file of this patent:

UNITED STATES PATENTS

| Number | Name | Date |
| --- | --- | --- |
| 2,332,953 | Tromp | Oct. 26, 1943 |
| 2,382,853 | Brammer | Aug. 14, 1945 |